Figure 1:
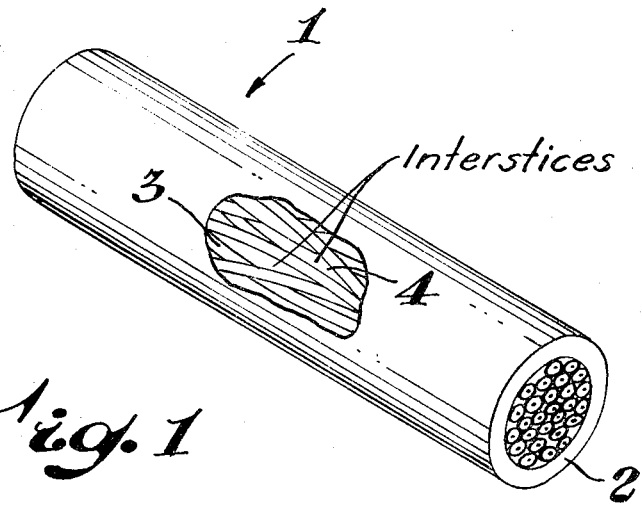

United States Patent
Woodland et al.

[15] 3,683,104
[45] Aug. 8, 1972

[54] HEAT RESISTANT CABLE

[72] Inventors: Paul C. Woodland, Daniel Moldovan, both of Midland, Mich. 48640

[73] Assignee: Dow Chemical Company, Midland, Mich.

[22] Filed: Jan. 7, 1971

[21] Appl. No.: 104,594

[52] U.S. Cl..................174/116, 174/25 C, 174/107
[51] Int. Cl.................................................H01b 7/02
[58] Field of Search..........174/116, 22 R, 22 C, 23 R, 174/23 C, 25 C, 25 P, 110 R, 110 B, 110 SR, 113 R, 27 R; 161/DIG. 5

[56] References Cited

UNITED STATES PATENTS 3,556,934  1/1971  Meyer...................161/DIG. 5

FOREIGN PATENTS OR APPLICATIONS 698,055  10/1953  Great Britain............174/25 C
995,582  6/1965  Great Britain............174/25 C

OTHER PUBLICATIONS

Mildner, Nacke, Veasey, Woodland, New Approaches To Fluid Blocking, The Dow Chemical Comp;, Dec. 1969, pp 12– 20

Kirk, Saul, Brooks, Progress and Pitfalls of Rural Buried Cable, Alberta Gov' t Telephones, Dec. 1969 pp 20– 22

*Primary Examiner*—Lewis H. Myers
*Assistant Examiner*—A. T. Grimley
*Attorney*—R. G. Waterman, Griswold & Burdick, L. J. Dankert and R. M. Mellom

[57] ABSTRACT

Heat resistant compositions comprising a blend or mixture of petrolatum and a partially cross-linked polymer such as p-tertiary-butylstyrene polymer cross-linked with dinvinylbenzene, which can also contain a multitude of hollow particles of a synthetic thermoplastic polymer such as a copolymer of styrene and acrylonitrile, are particularly useful as filler materials in cables such as communication cables.

4 Claims, 2 Drawing Figures

INVENTORS.
Paul C. Woodland
Daniel Moldovan

BY Ralph M Mellom
ATTORNEY

HEAT RESISTANT CABLE

This invention relates to heat resistant compositions. In one aspect, this invention relates to mixtures of organic materials having physical properties which remain substantially unchanged when heated. In another aspect, this invention relates to cable filler materials which serve to occupy the interstices within a cable. In yet another aspect, this invention relates to fluid blocked cables of a type wherein moisture transmission interiorly along the length of the cable is substantially eliminated.

The art of heat resistant compositions is replete with various thermoplastic and thermosetting materials which are organic in nature. For the most part, these compositions are able to withstand exposure to moderate quantities of heat without suffering a total loss in their physical properties. Since most of the heat resistant compositions of the prior art have been designed for a particular purpose or specific use, they do not individually possess a wide range of properties which allows any one composition to be used in several different ways to satisfy different needs.

A definite need exists in the art of organic type heat resistant compositions for a material which has desirable viscosity and thixotropic characteristics such that the material can be pumped, which is stable in the sense that it will maintain its physical integrity when subjected to elevated temperatures, and which is not detrimental to synthetic polymer materials such as plastics. When a heat resistant composition is employed in cable constructions, for example, to fill cables and thus provide a so-called block to guard against the transmission of fluids, it should have good dielectric properties in addition to the other desirable properties outlined above.

Cable constructions such as communication cables usually include a multitude of insulated conductors twisted together to form a bundle of generally parallel insulated conductors. The bundle of conductors, sometimes referred to as the cable core, is usually surrounded with a core wrap such as a helically wound tape and/or a metal strip longitudinally folded around the bundle of conductors. A plastic jacket of polyethylene or the like in the form of a layer is disposed around the core wrap to complete the cable construction.

The plastic jacket in cable constructions typified by the cable described above is intended to function as a barrier to prevent moisture from entering the cable and thus coming into the electric field of the cable. While the plastic jacket is reasonably effective for this purpose, in point of fact the plastic jacket is permeable to fluids such as water and water vapor. The water and water vapor will pass through the jacket and accumulate within the cable core, particularly after the cable has been exposed to water or water vapor for extended periods of time. Since the insulated conductors and core wrap define a multitude of connected interstices, once the water has entered the cable core it is free to migrate along the length of the cable through the interstices. Of course, if the plastic jacket becomes ruptured either during or after installation moisture will pass freely into the cable core and migrate lengthwise in either direction. In any event, regardless of how or why the water enters the cable, the presence of moisture within the cable core and the ease with which such moisture can travel lengthwise through the cable are undesirable because of the obvious detrimental affects which the moisture has on the cable. In control cables and power cables, for example, the presence of moisture is also objectionable for the reasons given above. In communication cables, the presence of moisture increases the attenuation of the cable, particularly when transmitting signals at high frequencies. The operation of individual pairs may be affected catastrophically if pinholes are present in thin-walled insulation and water enters the cable. Of course, the presence of moisture in any type of cable is undesirable because of the corrosive affect which it will have on the metal components of the cable.

The prior art has many techniques for preventing moisture from entering the core of a cable and many techniques for confining the moisture to localized areas by preventing it from migrating along the length of the cable. One such technique involves the use of petroleum jelly as a filler material in the interstices between the individual insulated conductors and between the conductors and the core wrap. While the petroleum jelly would theoretically reduce both moisture penetration and moisture transmission, as a practical matter it is undesirable because of the many shortcomings associated with its use. The petroleum jelly has a very high dielectric constant as compared to air which would otherwise exist in the interstices. The use of petroleum jelly thus increases the capacitance and attenuation of the cable to such a degree that the thickness of the insulation around the individual conductors must be increased by about 25 percent in order to achieve the same capacitance as that obtained in a cable without the petroleum jelly filler. The resulting cable is not only more expensive to manufacture because of the additional materials which must be used but it also is of much larger diameter because of the thicker conductor insulation. Another shortcoming associated with the use of petroleum jelly is its sensitivity to heat. When petroleum jelly-filled cables are used above ground or, for that matter, when they are stored on reels prior to being placed in service either above or below ground, the exposure to sunlight increases the temperature within the cable sufficiently to cause the petroleum jelly to become fluid. Since as a practical matter it is impossible to completely fill all of the interstices within a cable, when the petroleum jelly becomes fluid it will percolate around the conductors to the lowermost parts of the cable with the result that longitudinal channels will be formed in the cable. When moisture enters the cable, the channels serve as conduits for the moisture such that it is free to travel for a substantial length of the cable. Another shortcoming in using petroleum jelly as a cable filler is the fact that it will swell and thereby stress-crack the plastic insulation on the individual conductors.

In an attempt to overcome the shortcomings of petroleum jelly as a cable filling material, the prior art teaches blending polyethylene having a melting or softening point above about 100° C with the petroleum jelly. While this blend has a melting point greater than the highest temperature at which the cable is likely to be subjected, and thus overcomes the problems created when the filling compound becomes a liquid, the petroleum jelly is still detrimental to the plastic insulation on the individual conductors. Moreover, the blend also increases the capacitance and attenuation of the cable such that it is still necessary to use the thicker insulation around the conductors. The use of such a blend is also undesirable because during the cable filling operation higher temperatures must be used in order to effectively pump the filling material into the cable.

Another prior art cable filling material is polyethylene grease which is actually a low molecular weight polymer of ethylene. While the low molecular weight polyethylene is less susceptible to swelling and thus does not cause stress-cracking of the insulation surrounding the individual conductors, which occurs when petroleum jelly is employed, the low molecular weight polyethylene grease has a relatively high viscosity index. When cables filled with this material are subjected to elevated temperatures, the polyethylene grease will become fluid and will thus produce undesirable channeling within the cable in the same manner and with the same undesirable results as described in connection with cables filled with petroleum jelly.

According to this invention, these and other disadvantages of the prior art heat resistant compositions are overcome by a composition comprising a blend or mixture of petrolatum and a partially cross-linked polymer having a solubility parameter within about 0.5 unit of the solubility parameter of said petrolatum and characterized by being capable of becoming swelled by said petrolatum. The heat resistant composition can also contain a multitude of hollow, synthetic thermoplastic particles of a size between about 0.5 and about 200 microns. The compositions of this invention possess several desirable characteristics including the ability to retain their physical integrity and not become fluid, as compared to the petrolatum alone, when subjected to elevated temperatures. The compositions of this invention also have the necessary viscosity and thixotropic properties which allow them to be easily pumped without heating. The compositions are also compatible with polyolefin plastics in the sense that they have a low tendency to swell and thereby will not cause stress-cracking of the plastics when used as a filler in cables. In that embodiment of the invention which includes the hollow particles, the heat resistant compositions also possess excellent electrical properties in that they have a very low dielectric constant. In view of the several enumerated desirable properties, it is evident that the compositions of this invention are particularly suitable for use as a cable filling material to serve as a block against the transmission of fluids.

Accordingly, it is an object of this invention to provide a composition of organic materials having improved resistance to heat.

Another object of this invention is to provide a cable filling composition which can easily be pumped and which does not become fluid at temperatures to which a cable is normally exposed.

A further object of this invention is to provide a heat resistant composition having dielectric properties which render it suitable for use as a filler in cables.

Yet another object of this invention is to prevent fluids in the form of water or water vapor from traveling lengthwise within a cable.

A still further object of this invention is to provide a cable filling material which does not swell and thus will not produce stress-cracking in the plastic insulation surrounding the individual conductors within a cable.

A further object of the invention is to provide a cable having improved resistance to the transmission of fluids within the cable.

Figure 2:
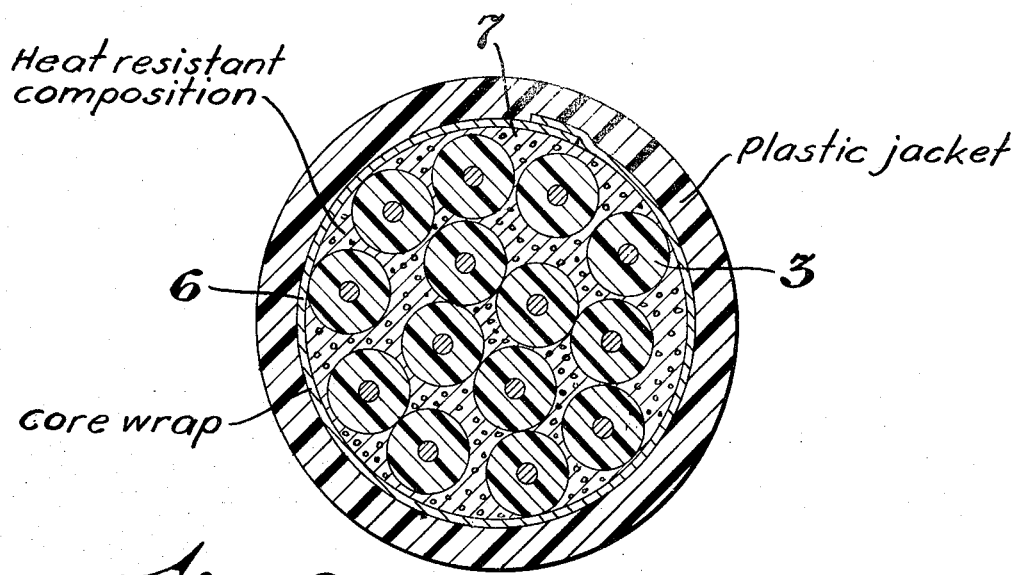

These and other objects of the invention will become apparent to one skilled in the art after studying the following detailed description, the appended claims, and the accompanying drawing wherein:

FIG. 1 is a partially broken isometric illustration of a cable having a plurality of twisted pair conductors; and FIG. 2 is a cross section of a cable having a plurality of insulated conductors with the heat resistant composition as a filler.

In the heat resistant compositions of the invention, the partially cross-linked polymer is of a type which is capable of becoming swelled by the petrolatum. The partially cross-linked polymer is essentially non-crystalline because a crystalline polymer will not become swelled by the petrolatum. As a general proposition, the solubility parameter of the partially cross-linked polymer is within about 0.5 unit of the solubility parameter of the petrolatum. Preferably, in order to achieve maximum swelling of the polymer, the solubility parameters of the partially cross-linked polymer and the petrolatum are substantially equal.

The solubility parameter or $\delta$ value of a material is described by Hildebrand and Scott in "The Solubility of Nonelectrolytes," Reinhold, 1949, and by H. Burrell in "Solubility Parameters," Interchemical Review, Vol. 14, pages 3 and 31, 1955. The solubility parameter of a material can be defined by the equation $\delta = d\Sigma G/M$ wherein $\delta =$ the solubility parameter, $d =$ the density of the material in the liquid state, $G =$ the molar-attraction constants for the atoms and groups of atoms in a molecule of the material, and $M =$ the molecular weight of the molecule. Further details of this equation and its use for determining the solubility parameter of a material can be obtained by reference to the above-noted article by H. Burrell.

As an illustration of how the solubility parameters can be employed in selecting a polymer to be used in the heat resistant compositions, the solubility parameter of petrolatum of the normal alkane series having 16 carbon atoms per molecule and a density of 0.835 is calculated by the equation above to be about 8.09. Since the solubility parameter of the partially cross-linked polymer should be within about 0.5 unit of the solubility parameter of the petrolatum, with this type petrolatum the solubility parameter of the partially cross-linked polymer should be between about 7.59 and about 8.59. Of course, as indicated above, maximum swelling of the polymer occurs when the solubility parameters are equal. Thus, in this illustration, a partially cross-linked polymer having a solubility parameter of about 8.09 is preferred. The solubility parameter of a partially cross-linked polymer of para-tertiary-butylstyrene having a density of 0.947 calculates to be 8.1. Since this value is approximately equal to the solubility parameter of the petrolatum, the poly(p-tertiary-butylstyrene) is readily swelled with the petrolatum.

The petrolatum employed in preparing the heat resistant composition of this invention can be obtained by fractional distillation of still residues left from the steam distillation of paraffin-base petroleum or by distillation of petroleum fractions having boiling points between about 330° and about 390° C. The consistency of the petrolatum used will depend at least in part upon the intended use for the heat resistant compositions. In general, petrolatum suitable for use in preparing the heat resistant compositions has a consistency at room temperature between a liquid having a viscosity of about 100 SUS and a semi-solid gelatinous mass having a melting point of about 60° C. The petrolatum is preferably substantially free of low molecular weight aromatic compounds, particularly when the heat resistant composition is to be used as a cable filler material, because the presence of such aromatics is believed to cause stress-cracking of polyolefins which may come into contact with the heat resistant compositions.

Polymers which can be partially cross-linked and/or which are inherently cross-linked and which can be utilized in preparing the heat resistant compositions include alkyl styrene polymers, polyisobutene, polyisobutylene, copolymers of butadiene and styrene, polyisoprene, ethylene propylene rubber, poly(isobornyl methacrylate), and the like. It is evident that the polymers identified above are intended to be exemplary only and that any suitable polymer having a solubility parameter within about 0.5 unit of the solubility parameter of the petrolatum can be used in the practice of the invention provided, of course, that the polymer is inherently partially cross-linked or is of a type which can be partially cross-linked.

The alkyl styrene polymers which can be employed in preparing the resistant compositions include homopolymers and copolymers of alkyl styrene monomers and copolymers of one or more alkyl styrene monomers with at least one other copolymerizable monomer. Thus, as used herein, the term "alkyl styrene polymers" is intended to include all of the homopolymers and the copolymers as defined above. The alkyl styrene polymers in the heat resistant compositions of this invention are partially cross-linked. As will be more fully hereinafter explained, some of the alkyl styrene polymers employed in the invention are inherently cross-linked by so-called hydrogen bonding due to the nature of the particular monomers which are copolymerized whereas others of the alkyl styrene polymers are cross-linked by means of a polyolefinically unsaturated compound.

The alkyl styrene polymers are prepared from alkyl styrene monomers having alkyl groups containing from three to 20 and preferably from four to 12 carbon atoms. Exemplary alkyl styrene monomers which can be homopolymerized or copolymerized include tertiary-alkylstyrenes such as p-tert-butylstyrene, p-tert-amylstyrene, p-tert-hexylstyrene, p-tert-octylstyrene, p-tert-dodecylstyrene, p-tert-octadecylstyrene, and p-tert-eicosylstyrene; sec-alkylstyrenes such as sec-butylstyrene, sec-hexylstyrene, sec-octylstyrene, sec-dodecylstyrene, sec-octadecylstyrene, and sec-eicosylstyrene; isoalkylstyrenes such as isobutylstyrene, isoamylstyrene, isohexylstyrene, isooctylstyrene, isododecylstyrene, isooctadecylstyrene, and isoeicosylstyrene; and the like.

Exemplary monomers which can be copolymerized with the alkyl styrene monomers include alkenyl aromatic compounds such as vinyl naphthalene, styrene, alphamethylstyrene, halostyrenes, arylstyrenes, and alkarylstyrenes; acrylic acid esters such as methacrylic esters, acrylic esters, fumarate esters and half esters, maleate esters and half esters, and itaconate esters and half esters; vinyl esters of aliphatic carboxylic acid esters; alkyl vinyl ethers; alkyl vinyl ketones; alphaolefins; isoolefins; acrylonitrile and methacrylonitrile; diolefins such as butadiene, isoprene, and dimethylbutadiene; and the like.

The alkyl styrene polymers can also contain copolymerized oxygen-containing polar compounds. Exemplary monomers within this class of compounds include $\alpha,\beta$-monoethylenically unsaturated carboxylic acids such as acrylic acid, methacrylic acid, itaconic acid, and citraconic acid; amides containing up to four carbon atoms such as acrylamide; hydroxy acrylic esters such as 2-hydroxyethyl methacrylate, 2-hydroxypropyl methacrylate, 3-hydroxypropyl methacrylate, 2-hydroxyethyl acrylate, 2-hydroxypropyl acrylate, and 3-hydroxypropyl acrylate; sulphonic acids such as 2-sulphoethyl methacrylate, 2-sulphoethyl acrylate, 3-vinylbenzenesulphonic acid, and 2-vinylbenzenesulphonic acid; and the like. When used, the oxygen-containing polar monomer is present in the alkyl styrene polymers in an amount between about 0.2 and about 10 weight percent and preferably between about 0.2 and about 3 weight percent.

The alkyl styrene polymers employed in the practice of this invention can be prepared by a variety of suitable processes well known in the art. In general, the alkyl styrene polymers can be produced by any suitable and convenient suspension, emulsion, or mass polymerization technique. The polymerization technique employed will depend at least in part upon the physical nature desired in the alkyl styrene polymer product. Thus, a suspension polymerization technique would probably be selected when it is desirous to have the polymer product in the form of free-flowing small beads. When it is desirable to have the polymer product in the form of particles having a maximum surface area, it is preferable to employ an emulsion polymerization technique so that the polymer can be conveniently recovered by spray drying. When it is desired to obtain the polymer product with a specific predetermined configuration, a mass polymerization technique utilizing a polymer-insoluble diluent can be employed.

In the preparation of the alkyl styrene polymers containing a copolymerized polar monomer by an emulsion polymerization technique, a mixture of monomer, catalyst, and water are typically heated with agitation in a jacketed reactor to a temperature of between about 40° C. and about 100° C. The reaction mass is maintained at a pH between about 3 and about 6. After the reaction is complete, the reactor is vented to atmosphere and the reaction mixture in the form of a latex having a solids content of about 40 weight percent is recovered. The reaction mixture is cooled, filtered to remove coagulum, and the polymer recovered by spray-drying at elevated temperature. The polymer product after drying is in the form of a fragile cake which can easily be crushed to a fine powder.

In the preparation of the alkyl styrene polymers containing the copolymerized polar monomers, it is generally preferred that the polymer be free of metallic ions in the form of, for example, surface active agents, catalysts residues, or other additives. Thus, catalysts such as ammonium or amine salts including, for example, ammonium persulfate can be satisfactorily employed. In the preparation of alkyl styrene polymers other than those containing the copolymerized oxygen-containing polar compound, it is not necessary to avoid the introduction of a metallic ion into the polymer. Thus, alkali metal salts of sulfonated fatty alcohols and the like can be used as an emulsifier during polymerization.

As indicated above, the polymers employed in the invention are partially cross-linked. The cross-linking is achieved by hydrogen bonding between polymer chains, due to the nature of the particular copolymerized monomer, and/or by other techniques such as, for example, by means of a cross-linking agent in the form of a di- or poly-functional monomer of a type well known in the art for achieving cross-linking. Exemplary cross-linking agents which can be employed to cross-link the alkyl styrene polymers include polyethylenically unsaturated compounds such as divinylbenzene, diethylene glycol dimethacrylate, diisopropenylbenzene, diisopropenyl-diphenyl, diallyl maleate, diallyl phthalate, allyl acrylates, allyl methacrylates, allyl fumarates, allyl itaconates, butadiene or isoprene polymers, cyclooctadiene, methylene norbornylenes, divinyl phthalates, vinyl isopropenylbenzene, divinyl biphenyl, and the like.

While the invention is not to be bound by or predicated upon any particular theory, it is believed that the partially cross-linked polymers function as an imbibing agent for the petrolatum in the heat resistant composition. It is further believed that the partially cross-linked polymers become swelled with the imbibed petrolatum. If the polymers are cross-linked too much, the imbibition of the petrolatum takes an unreasonable length of time and in some cases the polymer may be unable to imbibe a sufficient amount of the petrolatum. If the polymers contain too little cross-linking, they will dissolve in the petrolatum. Thus, the cross-linked density of the polymer can vary quite widely and, in general, is of a magnitude sufficient to cause the polymer to become swelled but not dissolved by the petrolatum. When a cross-linking agent is employed, as a general proposition it is present in the polymer in an amount between about 0.01 and about 2 weight percent based upon the weight of the polymer.

The synthetic thermoplastic particles which can be used in the heat resistant compositions of this invention are hollow and of generally spherical configuration having a diameter within the range of between about 0.5 and about 200 microns.

The hollow synthetic thermoplastic particles can be prepared from any suitable polymer material. As a general proposition, it has been found that the hollow particles can be suitably prepared by the limited coalescence polymerization technique. This polymerization technique involves the use of a polymerizable monomer and a volatile blowing agent which has a limited solubility in the polymer.

An illustrative technique for preparing one type of hollow particles involves charging a polymerization reactor with about 100 parts by weight de-ionized water and about 15 parts by weight of a 30 weight percent colloidal silica dispersion in water. The reactor is then charged with about 2.5 parts by weight of a 10 weight percent aqueous solution of a separately prepared copolymer of diethanolamine and adipic acid prepared from equimolar proportions by carrying out a condensation polymerization reaction to yield a polymer having a viscosity of about 100 centipoises at 25° C. The reactor is charged with about 1 part by weight of an aqueous solution containing about 2.5 weight percent potassium dichromate. Hydrochloric acid is then added to the aqueous solution in the reactor until a pH of 4 is reached.

An oil phase mixture is then prepared by mixing about 100 parts by weight methyl methacrylate which contains 20 weight percent neopentane and 0.1 part by weight of benzoyl peroxide as a catalyst. The oil phase mixture is added to the water phase in the reactor with agitation supplied by a blade rotating in the reactor. The mixture is maintained in the reactor at a temperature of about 80° C for a period of about 24 hours. At the end of this period, the temperature of the reaction mass is lowered and a white, milky liquid is recovered. A portion of the reaction mixture is filtered to recover particles which are air-dried in an oven at a temperature of about 30° C. Microscopic examination of a representative number of the unexpanded particles indicate that they have diameters up to about 10 microns. The particles are of hollow, spherical configuration and appear to contain a liquid and a small vapor phase. A portion of the dried particles are then expanded by heating in an air oven to a temperature of about 140° C for a period of about 3 minutes. This causes the particles to expand such that their diameters are about five times greater than before being heated. The particles have a relatively thin, transparent wall and a gaseous center.

While the foregoing description is illustrative of one technique for producing hollow synthetic thermoplastic particles which can be used in this invention, it is evident that other techniques can be employed with monomers other than methyl methacrylate. Similarly, expanding agents other than neopentane can be used if desired. Thus, for example, a copolymer of methyl methacrylate and acrylonitrile can be used in fabricating the hollow particles. The hollow particles can also be prepared by the technique outlined above from a copolymer containing 75 percent by weight combined vinylidene chloride and 25 percent by weight combined acrylonitrile by employing isobutane as the blowing agent. A polymer of styrene containing about 40 percent by weight combined acrylonitrile can be used to fabricate the hollow particles, if desired.

Other exemplary materials which can be used to make the hollow particles employed in the practice of this invention include a copolymer of 80 percent by weight methyl methacrylate and 20 percent by weight styrene; a copolymer of between about 10 and about 90 percent by weight methyl methacrylate and between about 10 and about 90 percent by weight ethyl acrylate; a copolymer of between about 10 and about 90 percent by weight methyl methacrylate and between about 10 and about 90 percent by weight ortho-chlorostyrene; poly(orthochlorostyrene); poly(vinylbenzyl chloride); a copolymer of between about 10 and about 90 percent by weight acrylonitrile and between about 10 and about 90 percent by weight vinylidene chloride; a copolymer of between about 10 and about 90 percent by weight acrylonitrile; a copolymer of methyl methacrylate and p-tertiary-butylstyrene; a copolymer of methyl methacrylate and vinyl acetate; a copolymer of methyl methacrylate and butyl acrylate; and the like. It is evident that any suitable thermoplastic material in addition to those enumerated above can be used if desired.

The petrolatum, partially cross-linked polymer, and optional hollow particles are employed in the heat resistant compositions of the invention in proportions selected according to the intended specific use and the results that are desired. In general, the heat resistant compositions can comprise between about 80 and about 99 and preferably between about 85 and about 97 weight percent petrolatum and between about 1 and about 20 and preferably between about 3 and about 15 weight percent partially cross-linked polymer. When the hollow particles are present, the heat resistant compositions comprise between about 68 and about 97 and preferably between about 80 and 91 weight percent petrolatum, between about 1 and about 17 and preferably between about 3 and about 10 weight percent partially cross-linked polymer, and between about 2 and about 15 and preferably between about 6 and about 10 weight percent hollow plastic particles, based upon the weight of the particles prior to their being expanded by the application of heat. It is evident that the relative amounts of the components in the heat resistant compositions set forth above are intended to be exemplary only and that concentrations outside the ranges specified can be made without departing from the spirit and scope of the invention.

As indicated above, the solubility parameter of the partially cross-linked polymer is within about 0.5 unit of the solubility parameter of the petrolatum and is preferably substantially equal to the solubility parameter of the petrolatum. Since the solubility parameter of petrolatum is within the range of about 7.9 to about 8.3, depending upon the cohesive energy density of the particular petrolatum molecule and the liquid density of the petrolatum, the solubility parameter of the partially cross-linked polymer should be within the range of about 7.4 and about 8.8.

The heat resistant compositions can be prepared by any suitable and convenient technique. When the hollow particles are employed in the heat resistant compositions, their amount is for convenience based upon their weight before being expanded. The heat resistant compositions can be prepared by blending or mixing together the petrolatum, partially cross-linked polymer, and unexpanded hollow plastic particles. A conventional blender can be operated at room temperature to produce the blend. Other techniques may be necessary, depending upon the consistency of the components, to effectively produce the blend or mixture. The hollow particles are then expanded by applying heat to the blend. The heat also causes the petrolatum to become gelled by the partially cross-linked polymer. It is also within the spirit and scope of the invention to expand the hollow plastic particles before they are blended with the petrolatum and partially cross-linked polymer. The same technique can be employed to prepare the heat resistant compositions which do not contain the hollow plastic particles.

While the heat resistant compositions of this invention have almost unlimited utility in a variety of fields, as indicated above they are particularly suitable as a filler material in cables to assist in preventing water from entering the cable and to prevent water from migrating along the length of the cable. The heat resistant compositions can also be used as a filler material in terminal boxes and as a potting compound in transistor circuits and the like.

Referring now to the drawings, wherein like reference numerals have been used to denote like elements wherever possible, an illustrative embodiment of the invention will be described in more detail. In FIG. 1, a cable shown generally by reference numeral 1 includes a plastic jacket 2 disposed around a plurality of insulated conductors 3 twisted together such that they define a plurality of interstices 4.

As illustrated by FIG. 2, which is a cross-section of a cable employing the heat resistant compositions of the invention as a filler, the insulated conductors 3 are arranged in a bundle which is surrounded by a core wrap 6 in the form of a longitudinally folded metal tape. A plastic jacket 2 surrounds the core wrap 6. A cable filler 7, embodying the heat resistant compositions of the invention, is disposed in the interstices between the several insulated conductors 3 and between the conductors and the core wrap 6.

While the core wrap 6 is illustrated as being constructed of metal, it is within the spirit and scope of the invention to employ a core wrap material other than metal such as, for example, paper, plastic, and the like. The core wrap can also be provided with an adhesive coating on one or both sides for the purpose of achieving a bond between the overlapped edges of the core wrap and a bond between the core wrap and the plastic jacket. Suitable exemplary adhesives include random and graft copolymers of ethylene and $\alpha,\beta$-ethylenically unsaturated carboxylic acids having between three and eight carbon atoms per molecule. Exemplary acids which can be copolymerized with ethylene or graft polymerized onto polyethylene include acrylic acid, methacrylic acid, crotonic acid, maleic anhydride and the like.

The plastic jacket 2 of the cable can be fabricated from any suitable composition such as, for example, polyethylene, polypropylene, chlorinated polyethylene, and the like. The material employed in constructing the plastic jacket can be compounded with carbon black if desired.

Cables employing the heat resistant compositions of this invention as a filler can thus comprise a plurality of insulated conductors arranged to define a plurality of interstices, a core wrap disposed around the plurality of insulated conductors, a plastic jacket surrounding the core wrap, and a heat resistant composition disposed in the interstices, the heat resistant composition comprising, as defined above, a blend or mixture of petrolatum, a partially cross-linked polymer, and, as an option, a multitude of hollow particles of a synthetic thermoplastic polymer. The core wrap can be in the form of a paper strip and/or a metal strip helically wound or longitudinally folded around the plurality of conductors.

Cables containing the heat resistant composition as a filler can be fabricated by suitable techniques well known in the art. An exemplary technique for fabricating a twisted, multi-pair communication cable includes the steps of passing a plurality of twisted pairs of insulated conductors into a forming zone to produce a bundle of the conductors and subsequently passing the bundle of conductors through a stuffer box. The stuffer box is connected to a pump by means of a conduit which serves to transmit the heat resistant composition from the pump to the stuffer box. The heat resistant composition is passed through the side of the stuffer box under sufficient pressure to force it into the interstices between the several insulated conductors. The stuffer box can be adjusted to provide a layer of the heat resistant compositions around the periphery of the bundle of conductors. The bundle of conductors including the heat resistant composition disposed within the bundle is passed from the stuffer box to a core wrapping machine which longitudinally folds a strip of aluminum around the bundle. In a preferred embodiment, the strip of aluminum has an adhesive coating of a random copolymer of ethylene and acrylic acid on both sides for the purpose of achieving a bond between the overlapped edges of the strip. After the core wrap has been applied, the bundle having the core wrap as its outer most surface is passed through a cross-head die attached to an extruder which extrudes a layer of polyethylene containing carbon black around the core wrap. The resulting cable is then collected on a take-up reel. While the several foregoing steps can be performed individually with interruptions between each step, it is generally preferred that the cable be fabricated on a continuous basis to avoid the necessity of using storage reels between the several steps.

The following examples are included for the purpose of demonstrating the desirable properties of the heat resistant compositions. It must be understood that these examples are for the purpose of illustration only and should not be construed as limiting of the invention.

EXAMPLE I

A heat resistant composition was prepared by blending about 86.45 parts by weight petrolatum having a viscosity of 332 SUS, about 4.55 parts by weight partially cross-linked poly(p-tert-butylstyrene) containing about 1 weight percent copolymerized methacrylic acid, and about 9 parts by weight unexpanded hollow particles containing about 35 weight percent neopentane and prepared from a copolymer of about 60 weight percent styrene and about 40 weight percent acrylonitrile. The resulting blend was heated in an air oven for about 5 minutes at 140° C to expand the hollow particles.

In order to evaluate the stability of the heat resistant compositions of the invention, about 30 grams of the heat resistant composition prepared by the technique described above were spooned into a flat, metal container having sides about one-quarter inch high and a diameter of about 3 inches. After being deposited in the container, the heat resistant composition had the appearance of divinity fudge candy with several hair-like strings of material projecting from its irregular surface. The container was then placed on its side within a drip pan and fastened securely. Although this resulted in the heat resistant composition being attached to a vertical surface, the gravitational forces did not have any affect on the configuration of the composition. The drip pan containing the heat resistant composition was then placed in a hot air oven and the temperature maintained at 85° C for a period of 14 hours. At the end of this time, the drip pan was removed and the heat resistant composition inspected. It was observed that none of the heat resistant composition had melted and none of it had flowed into the drip pan. The irregular surface configuration of the heat resistant composition including the hair-like strands which projected from its surface was unchanged. It was also observed that the physical integrity of the heat resistant composition was unchanged. It was further observed that the physical integrity of the heat resistant composition was unchanged as a result of the tests and that it still remained pumpable.

In a control run, low molecular weight polyethylene grease was placed in a container and tested for heat resistance in the same manner as described above in connection with the heat resistant composition. At the end of 14 hours at 85° C, the polyethylene grease had completely melted and flowed from the vertical surface into the drip pan. The results of this control run show that the low molecular weight polyethylene grease is very sensitive to heat and that the grease would melt and flow when used as a cable filler material.

In another control run, a blend of 85 weight percent petroleum jelly and about 15 weight percent low density polyethylene was tested for heat sensitivity in the same manner as described above. After the 14 hour heating step, more than 90 percent of the blend had flowed from the vertical surface into the drip pan. These results indicate that the addition of polyethylene to petroleum jelly does not adequately decrease the heat sensitivity of the petroleum jelly.

EXAMPLE II

In order to demonstrate the suitability of the heat resistant compositions as a cable filler material, low density polyethylene of a type used for insulating conductors was contacted at different elevated temperatures with the heat resistant compositions and with other cable filler materials. The polyethylene insulation was tested for ultimate tensile strength and ultimate elongation after being contacted with the several cable filler materials. In making these runs, Number 22 AWG conductors having an insulation layer of low density polyethylene about 8 mils thick were individually immersed into a heated beaker containing a sample of the cable filler material. Each of the conductors were immersed in the cable filler material for 1 minute at each of the test temperatures. At the end of the 1 minute exposure period, the insulated conductors were removed, cooled, and the conductor wire was pulled out of the insulation. The annular-shaped low density polyethylene insulation was then tested for ultimate elongation and ultimate tensile strength by clamping each specimen between the jaws of an Instron tester such that a one inch long section of each specimen extended between the jaws. The testing was conducted at room temperature with a cross-head separation rate of about 2 inches per minute. The ultimate elongation of the polyethylene insulation without exposure to any of the cable filler materials was measured and found to be about 604 percent. The ultimate tensile strength of the polyethylene insulation without exposure to any of the cable filler materials was measured and found to be about 2,600 psi. The ultimate elongation of each of the test specimens after exposure to the several cable filler materials is reported in Table I below. The ultimate tensile strength of the several specimens after exposure to the several cable filler materials is reported in Table II below.

TABLE I

| Cable Filler Material | Ultimate Elongation (per cent) After Exposure For One Minute at Indicated Temperature (°F) | | |
| --- | --- | --- | --- |
| | 185° | 225° | 250° |
| Heat Resistant Composition[1] | 697 | 622 | 618 |
| Heat Resistant Composition[2] | 616 | 610 | 550 |
| Petrolatum[3] | 621 | 486 | 492 |
| PJ/PE[4] | 581 | 654 | 472 |
| Polyethylene Grease | 574 | 658 | 589 |
| Petroleum Jelly | 556 | 504 | 463 |

TABLE II

| Cable Filler Material | Ultimate Tensile Strength (psi) After Exposure For One Minute At Indicated Temperature (°F) | | |
| --- | --- | --- | --- |
| | 185° | 225° | 250° |
| Heat Resistant Composition[1] | 2600 | 2630 | 2470 |
| Heat Resistant Composition[2] | 2430 | 2340 | 2230 |
| Petrolatum[3] | 2520 | 1605 | 1395 |
| PJ/PE[4] | 2400 | 2580 | 1740 |
| Polyethylene Grease | 2400 | 2530 | 2340 |
| Petroleum Jelly | 2280 | 1820 | 1340 |

Footnotes to Tables I and II
1. Blend of 9 weight percent (based upon unexpanded weight) hollow particles of a 60 weight percent styrene and 40 weight percent acrylonitrile copolymer containing 35 weight percent neopentane, 86.45 weight percent petrolatum having a viscosity of 332 SUS, and 4.55 weight percent poly(t-butylstyrene) containing 1 weight percent copolymerized methacrylic acid
2. Blend of 95 weight percent normally solid petrolatum and 5 weight percent poly(t-butylstyrene) containing 1 weight percent copolymerized methacrylic acid
3. Viscosity of 332 SUS
4. Blend of petroleum jelly containing about 15 weight percent polyethylene As evidenced by the data reported in Table I, the heat resistant compositions of this invention do not have a deleterious effect on the conductor insulation as do the remaining cable filler materials. It is also important to note from Table I that the petrolatum alone causes a substantial reduction in the ultimate elongation of the conductor insulation. The results achieved with the heat resistant composition, in terms of ultimate elongation, are surprising and unexpected because the heat resistant compositions contained about 86 and about 95 weight percent petrolatum, respectively.

As indicated by the data reported in Table II, the ultimate tensile strength of the conductor insulation after contacting with the heat resistant compositions is substantially unaffected at contacting temperatures of 185° and 225° F, and is only slightly reduced at a contacting temperature of 250° F. The petrolatum cable filler material, on the otherhand, causes a large decrease in tensile strength, and at a contacting temperature of 250° F the ultimate tensile strength is reduced almost 50 percent. While the polyethylene grease cable filler is not as harmful as the petrolatum, in terms of effect on tensile strength, this material is unsatisfactory because of its high dielectric constant.

Although the invention has been described in considerable detail, such detailed description is only for the purpose of illustrating specific embodiments. It is evident that many variations and modifications can be made from those described without departing from the spirit and scope of the invention.

What is claimed is:

1. In a cable comprising a plurality of insulated conductors arranged to define a plurality of interstices, a core wrap disposed around said plurality of insulated conductors, and a plastic jacket surrounding said core wrap, the improvement comprising a heat resistant composition disposed in said interstices, said heat resistant composition comprising petrolatum and a partially cross-linked polymer having a solubility parameter within about 0.5 unit of the solubility parameter of said petrolatum and characterized by being capable of becoming swelled by said petrolatum.

2. A cable according to claim 1 wherein said heat resistant composition includes a multitude of hollow, synthetic thermoplastic particles.

3. A cable according to claim 2 wherein said petrolatum is present in an amount between about 68 and about 97 weight percent; said partially cross-linked polymer is present in an amount between about 1 and about 17 weight percent; and said multitude of hollow, synthetic thermoplastic particles is present in an amount between about 2 and about 15 weight percent, based upon the weight of said particles prior to expansion.

4. A cable according to claim 1 wherein said partially cross-linked polymer contains between about 0.01 and about 2 weight percent cross-linking agent.

* * * * *